(12) United States Patent
Takigawa et al.

(10) Patent No.: US 8,198,205 B2
(45) Date of Patent: Jun. 12, 2012

(54) AROMATIC BLOCK COPOLYMER, DECOMPOSITION METHOD THEREOF AND ANALYSIS METHOD USING THE DECOMPOSITION METHOD

(75) Inventors: Hiroshi Takigawa, Toyonaka (JP); Tomohito Yoshii, Ibaraki (JP); Shino Matsumi, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 217 days.

(21) Appl. No.: 12/308,770

(22) PCT Filed: Jun. 29, 2007

(86) PCT No.: PCT/JP2007/063518
§ 371 (c)(1),
(2), (4) Date: Dec. 23, 2008

(87) PCT Pub. No.: WO2008/004642
PCT Pub. Date: Jan. 10, 2008

(65) Prior Publication Data
US 2009/0197763 A1    Aug. 6, 2009

(30) Foreign Application Priority Data
Jul. 3, 2006  (JP) .................................. 2006-183064

(51) Int. Cl.
*B01J 31/00*    (2006.01)
(52) U.S. Cl. ...... 502/159; 526/346; 525/241; 428/36.92; 73/23.35
(58) Field of Classification Search .................. None
See application file for complete search history.

(56) References Cited

U.S. PATENT DOCUMENTS

| | | | | |
|---|---|---|---|---|
| 3,480,583 A | * | 11/1969 | O'Connor et al. | ............ 556/446 |
| 2002/0065225 A1 | * | 5/2002 | Muimo et al. | .................. 514/14 |
| 2008/0004360 A1 | * | 1/2008 | Yamada et al. | ................. 521/27 |

FOREIGN PATENT DOCUMENTS

| | | | |
|---|---|---|---|
| JP | 06299070 A | * | 10/1994 |
| JP | 2005-320523 | | 11/2005 |
| JP | 2007-109638 | | 4/2007 |
| WO | WO 2006/095919 A1 | | 9/2006 |

OTHER PUBLICATIONS

Tanaka, Yasuyuki et al., "Determination of Sequence Length Distribution in SBR by Ozonolysis-g.p.c. Method", Polymer, 1981, vol. 22, pp. 1721-1723.

* cited by examiner

*Primary Examiner* — Melvin C Mayes
*Assistant Examiner* — Melissa Stalder
(74) *Attorney, Agent, or Firm* — Foley & Lardner LLP

(57) ABSTRACT

Provided is a decomposition method of an aromatic block copolymer, wherein the aromatic block copolymer comprises a segment 1 represented by the following general formula (1) and a segment 2 comprising a structural unit represented by the following general formula (2) and/or a structural unit represented by the following general formula (3), and the segment 2 is subjected to chemical decomposition.

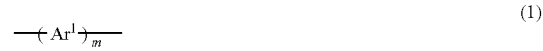

(1)

(wherein m represents an integer of 5 or more, $Ar^1$ represents a divalent aromatic group that may have a substituent, and $Ar^1$s of 5 or more may be the same as or different from each other,)

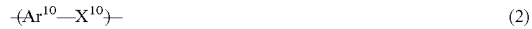

(2)

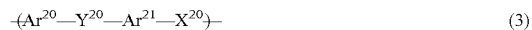

(3)

(wherein $Ar^{10}$, $Ar^{20}$ and $Ar^{21}$ each independently represent a divalent aromatic group that may have a substituent, $X^{10}$ and $X^{20}$ each independently represent an oxygen atom, a sulfur atom, an alkylene group having 1 to 10 carbon atoms or a fluorine-substituted alkylene group having 1 to 10 carbon atoms, and $Y^{20}$ represents a sulfonyl group, a carbonyl group or a fluorine-substituted alkylene group having 1 to 10 carbon atoms).

8 Claims, No Drawings

AROMATIC BLOCK COPOLYMER, DECOMPOSITION METHOD THEREOF AND ANALYSIS METHOD USING THE DECOMPOSITION METHOD

TECHNICAL FIELD

The present invention relates to an aromatic block copolymer containing a segment of a polyarylene structure and the other segment, and a suitable decomposition method in analyzing the structural information. Precisely, it relates to a decomposition method selectively decomposing the other segment in the aromatic block copolymer by a specific chemical decomposition treatment, and an analysis method analyzing decomposed matter obtained by the decomposition method.

BACKGROUND ART

A block copolymer, according to the description of "Chemical Dictionary (popular edition) edited by Seiji Shida, published by Morikita Publishing Co., Ltd. in 1985," is "a polymer that polymer segments having different chemical structures of two kinds or more in a molecule are mutually linked," for example, a block copolymer containing a hard segment wherein a polymer chain is rigid and a soft segment wherein a polymer chain is flexible, has variously been developed as a block copolymer with strength and toughness. Regarding such block copolymer having polymer segments (hereinafter abbreviated as "segment") with contradictory properties each other, physical properties of the block copolymer vary easily depending on the chain length of segment and repeating degree, thus an analysis technique effective for a quality control on its production is important to obtain a block copolymer with a stable quality.

As a method for producing the block copolymer, examples include a method that after obtaining polymers which can be segments of two kinds or more (segment precursor polymers) each by polymerization, these are linked; and a method that a segment precursor polymer having a reactive group at the terminal is produced beforehand, and a monomer inducing the other segment is sequentially polymerized with the precursor polymer. In these production methods, a technique that quality of segments constituting a block copolymer is controlled by conducting a polymer analysis at a stage of a segment precursor polymer which a production intermediate to produce a block copolymer of a final product stably, is ordinarily used. However, a practical method for analyzing and evaluating segments constituting the copolymer after obtaining a block copolymer is hardly developed.

As a typical example of analysis techniques on each segment constituting a block copolymer, for a styrene-butadiene copolymer, a method for analyzing a polystyrene segment by ozone decomposition of a polybutadiene segment, is proposed (for example, see "Y. Tanaka, et. al.: Rubber Chem. Yechnol., 59, 16 (1986)"). However, since ozone is highly reactive, unless the conditions are strictly controlled, ozone decomposition itself is poorly reproducible, so it is not sufficient for an analysis method aiming at quality control. Application of ozone decomposition is limited to a polymer derived from diene and a polymer having a polyalkylene oxide chain (for example, see "new edition, Polymer Analysis Handbook, published by Kinokuniya Company Ltd. in 1994"), and there is almost no example of the application to other polymers at present.

By the way, an attention is drawn to an aromatic block copolymer in applications such as ion-conducting membrane, oxygen-permeating membrane and ion-exchange membrane, being suitable in terms of mechanical strength and heat resistance, and exhibiting functionalities on phase separation when formed in a film shape. In the developments of aromatic block copolymers with higher performance, in particular, a technique for a more precise structural analysis, in particular, a technique for analyzing block constitution and each segment independently is desired. However, since such aromatic block copolymer is basically low in decomposability, a technique of decomposing almost all polymer structures at high temperature, such as pyrolysis gas chromatography, is ordinarily used, and there is no method for selectively analyzing segments constituting an aromatic block copolymer at all.

DISCLOSURE OF THE INVENTION

Among the above-described aromatic block copolymers, a block copolymer having a polyarylene segment that aromatic rings are directly bonded has a chemical and mechanical stability when formed in a film, thus it is studied on applications to various functional polymers. However, as the production method, a Yamamoto polymerization method or a Suzuki polymerization method tends to give a polymer having a wider molecular weight distribution than a polymer obtained by addition polymerization, and above all, in production of the aromatic block copolymer, it is important to obtain structural information such as molecular weight distribution of polyarylene segments for quality control of the aromatic block copolymer.

Therefore, an object of the present invention is to provide a suitable decomposition method of the aromatic block copolymer in an analysis means with simplicity and high precision in regard to an aromatic block copolymer having a polyarylene segment. Further, by treating the aromatic block copolymer by the decomposition method, it provides an analysis method with higher precision than a conventional analysis method in order to determine characteristics of the aromatic block copolymer. Furthermore, it provides an aromatic copolymer having a polyarylene segment with a specific polymer weight distribution obtained by the above-described analysis method of the present invention.

The present inventors intensively studied to solve the above-described problems, and as a result, they have completed the invention.

That is, the present invention provides:

[1] A decomposition method of an aromatic block copolymer, wherein the aromatic block copolymer comprises a segment 1 represented by the following general formula (1) and a segment 2 comprising a structural unit represented by the following general formula (2) and/or a structural unit represented by the following general formula (3), and the segment 2 is subjected to chemical decomposition.

(1)

(wherein m represents an integer of 5 or more, $Ar^1$ represents a divalent aromatic group that may have a substituent, and $Ar^1$s of 5 or more may be the same as or different from each other,)

(2)

(3)

(wherein $Ar^{10}$, $Ar^{20}$ and $Ar^{21}$ each independently represent a divalent aromatic group that may have a substituent, $X^{10}$ and $X^{20}$ each independently represent an oxygen atom, a sulfur atom, an alkylene group having 1 to 10 carbon atoms or a fluorine-substituted alkylene group having 1 to 10 carbon atoms, and $Y^{20}$ represents a sulfonyl group, a carbonyl group or a fluorine-substituted alkylene group having 1 to 20 carbon atoms).

Further, as a mode of an aromatic block copolymer applied to the present invention, the following [2] and [3] are preferable.

[2] The decomposition method described in [1], wherein the aromatic block copolymer is a block copolymer having an ion-exchange group and/or a group obtained by protecting an ion-exchange group with a protecting group.

[3] The decomposition method described in [1], wherein the aromatic block copolymer is a block copolymer having an ion-exchange group and/or a group obtained by protecting an ion-exchange group with a protecting group in a part of or all of $Ar^1$s of 5 or more constituting the segment represented by the general formula (1).

Further, as suitable embodiments in the chemical decomposition of the present invention, following [4] to [7] are provided.

[4] The decomposition method described in any one of [1] to [3], wherein the chemical decomposition is decomposition of the aromatic block copolymer by a basic compound.

[5] The decomposition method described in [4], wherein the basic compound contains an organic amine.

[6] The decomposition method described in [4], wherein the basic compound contains a cyclic organic amine.

[7] The decomposition method described in [4], wherein the basic compound contains at least one cyclic organic amine selected from the group consisting of pyrrolidine, piperazine and piperidine.

Further, the present invention provides the following analysis methods of [8] to [10] using the decomposition method described in any one of [1] to [7].

[8] An analysis method of an aromatic block copolymer, identifying a chemical structure of a high molecular component in a decomposed matter obtained by the decomposition method described in any one of [1] to [7].

[9] An analysis method of an aromatic block copolymer, analyzing a molecular weight and/or a molecular weight dispersion of a high molecular component in a decomposed matter obtained by the decomposition method described in any one of [1] to [7].

[10] An analysis method of an aromatic block copolymer, analyzing a molecular weight and/or a polydispersity of a high molecular component in a decomposed matter obtained by the decomposition method described in any one of [1] to [7], by means of size exclusion chromatography.

Further, the present invention provides the following [11] and [12] obtained by any one of the decomposition methods described above.

[11] An aromatic block copolymer, wherein a polydispersity of a high molecular component in a decomposed matter is 7.0 or less, when the segment 2 is decomposed by 90% by weight or more to the total weight by the decomposition method described in any one of [1] to [7].

[12] An aromatic block copolymer, wherein a polydispersity of a high molecular component in a decomposed matter is 5.0 or less, when the segment 2 is decomposed by 90% by weight or more to the total weight by the decomposition method described in any one of [1] to [7].

The aromatic block copolymer of [11] or [12] can be applied to various applications, and the following [13] to [20] are provided.

[13] A molded article comprising the aromatic block copolymer described in [11] or [12].

[14] A film comprising the aromatic block copolymer described in [11] or [12].

[15] A film, which is obtained by forming the aromatic block copolymer described in [11] or [12] into a film by a solution casting method.

[16] A molded article, which is obtained by forming the aromatic block copolymer described in [11] or [12] by a heat-pressing molding method, an injection molding method, an extrusion molding method, a melt-spinning molding method, a calendar molding method, a roll forming method or a blow molding method.

[17] A fiber comprising the aromatic block copolymer described in [11] or [12].

[18] A hollow body comprising the aromatic block copolymer described in [11] or [12].

[19] A bead comprising the aromatic block copolymer described in [11] or [12].

[20] A catalyst composition containing the aromatic block copolymer described in [11] or [12], and a catalyst.

The decomposition method of the present invention can provide a simple analysis method for obtaining structural information of an aromatic block copolymer having a polyarylene segment capable of being used suitably as a functional polymer material with excellent chemical stability and mechanical strength. Further, the analysis method makes it possible to obtain information such as chain length of a segment of the aromatic block copolymer reproducibly and precisely, and is suitable for an analysis method of quality control on a stable production of the aromatic block copolymer, and is industrially useful.

Further, an aromatic block copolymer having a polyarylene segment with a specific polydispersity (Mw/Mn) obtained by the present invention is also useful when processed into a film or the like from the viewpoints that it can be processed into a film with a very small haze value and optical transparence.

BEST MODE FOR CARRYING OUT THE INVENTION

Hereinafter, the present invention is detailed.

The aromatic block copolymer applied to the present invention has a segment 1 represented by the general formula (1) and a segment 2 comprising a structural unit represented by the general formula (2) and/or a structural unit represented by the general formula (3).

First, the segment 1 represented by the general formula (1) is explained. $Ar^1$ represents a divalent aromatic group that may have a substituent, a plurality of $Ar^1$s in the segment represented by the general formula (1) may be the same as or different from each other. Examples of the divalent aromatic group include a divalent monocyclic aromatic group such as 1,3-phenylene group and 1,4-phenylene group; a divalent ring-fused aromatic group such as 1,3-naphthalene-diyl group, 1,4-naphthalene-diyl group, 1,5-naphthalene-diyl group, 1,6-naphthalene-diyl group, 1,7-naphthalene-diyl group, 2,6-naphthalene-diyl group, 2,7-naphthalene-diyl group and fluorene-diyl group; and a divalent aromatic heterocyclic group such as pyridine-diyl group, quinoxaline-diyl group and thiophene-diyl group. In particular, a divalent monocyclic aromatic group is preferable.

Examples of substituent of $Ar^1$ include a halogen atom, a hydroxyl group, a cyano group, a nitro group, an alkyl group that may have a substituent having 1 to 20 carbon atoms, an alkoxy group that may have a substituent having 1 to 20 carbon atoms, an acyl group that may have a substituent having 1 to 20 carbon atoms, an aryl group that may have a substituent having 6 to 20 carbon atoms, an aryloxy group that may have a substituent having 6 to 20 carbon atoms, an arylcarbonyl group that may have a substituent having 7 to 20 carbon atoms, an ion-exchange group and a group obtained by protecting the ion-exchange group with a protective group. Examples of the ion-exchange group include an acid group such as carboxyl group, sulfonic group, phosphoric group, phosphorous group and sulfoneimido group; and a basic group such as amino group that may have a substituent and quaternary ammonium group. Examples of the group obtained by protecting the ion-exchange group with a protective group include a group wherein the acid group is protected by esterification or amidation (hereinafter called "protected acid group") and a group wherein an amino group is protected by amidation (hereinafter called "protected amino group").

A halogen atom is selected from a fluorine atom, a chlorine atom, a bromine atom and an iodine atom.

Examples of an alkyl group that may have a substituent having 1 to 20 carbon atoms include a linear alkyl group, a branched alkyl group or a cyclic alkyl group having 1 to 20 carbon atoms such as methyl group, ethyl group, propyl group, butyl group, pentyl group, hexyl group, nonyl group, dodecyl group, hexadecyl group, octadecyl group and icosyl group; and an alkyl group having the total carbon numbers of 20 or less, wherein the foregoing alkyl group is substituted by a fluorine atom, a hydroxyl group, nitrile group, amino group, methoxy group, ethoxy group, isopropyloxy group, phenyl group, naphthyl group, phenoxy group, naphthyloxy group, phenoxyphenoxy group, naphthoxyphenoxy group, the foregoing acid group, the foregoing protected acid group, the foregoing basic group, the foregoing protected amino group or the like.

Examples of an alkoxy group that may have a substituent having 1 to 20 carbon atoms include a linear alkoxy group, a branched alkoxy group or a cyclic alkoxy group having 1 to 20 carbon atoms such as methoxy group, ethoxy, group, propyloxy group, butyloxy group, hexyloxy group, decyloxy group, dodecyloxy group, hexadecyloxy group, icosyloxy group; and an alkoxy group having the total carbon numbers of 20 or less, wherein the foregoing alkoxy group is substituted by a fluorine atom, a hydroxyl group, nitrile group, amino group, methoxy group, ethoxy group, isopropyloxy group, phenyl group, naphthyl group, phenoxy group, naphthyloxy group, phenoxyphenoxy group, naphthoxyphenoxy group, the foregoing acid group, the foregoing protected acid group, the foregoing basic group, the foregoing protected amino group or the like.

Examples of an acyl group that may have a substituent having 1 to 20 carbon atoms include a linear acyl group, a branched acyl group or a cyclic acy group having 1 to 20 carbon atoms such as formyl group, acetyl group, propionyl group, butyryl group, pentylcarbonyl group, hexylcarbonyl group, pyvaloyl group, nonylcarbonyl group, undecylcarbonyl group, pentadecylcarbonyl group, heptadecylcarbonyl group and nonadecylcarbonyl group; and an acyl group having the total carbon numbers of 20 or less, wherein the foregoing acyl group is substituted by a fluorine atom, a hydroxyl group, nitrile group, amino group, methoxy group, ethoxy group, isopropyloxy group, phenyl group, naphthyl group, phenoxy group, naphthyloxy group, phenoxyphenoxy group, naphthoxyphenoxy group, the foregoing acid group, the protected acid group, the foregoing basic group, the foregoing protected amino group or the like.

Examples of an aryl group that may have a substituent having 6 to 20 carbon atoms include an aryl group such as phenyl group, naphthyl group, phenanthrenyl group and anthracenyl group, and an aryl group having the total carbon numbers of 20 or less, wherein the foregoing aryl group is substituted by a fluorine atom, a hydroxyl group, nitrile group, amino group, methoxy group, ethoxy group, isopropyloxy group, phenyl group, naphthyl group, phenoxy group, naphthyloxy group, phenoxyphenoxy group, naphthoxyphenoxy group, the foregoing acid group, the foregoing protected acid group, the foregoing basic group, the foregoing protected amino group or the like.

Examples of an aryloxy group that may have a substituent having 6 to 20 carbon atoms include an aryloxy group such as phenoxy group, naphthyloxy group, phenanthrenyloxy group and anthracenyloxy group; and an aryloxy group having the total carbon numbers of 20 or less, wherein the foregoing aryloxy group is substituted by a fluorine atom, a hydroxyl group, nitrile group, amino group, methoxy group, ethoxy group, isopropyloxy group, phenyl group, naphthyl group, phenoxy group, naphthyloxy group, phenoxyphenoxy group, the foregoing acid group, the foregoing protected acid group, the foregoing basic group, the foregoing protected amino group or the like.

Examples of an arylcarbonyl group that may have a substituent having 7 to 20 carbon atoms include an arylcarbonyl group such as benzoyl group, naphthoyl group and anthracenylcarbonyl group; and an arylcarbonyl group having the total carbon numbers of 20 or less, wherein the foregoing arylcarbonyl group is substituted by a fluorine atom, a hydroxyl group, nitrile group, amino group, methoxy group, ethoxy group, isopropyloxy group, phenyl group, naphthyl group, phenoxy group, naphthyloxy group, phenoxyphenoxy group, the foregoing acid group, the foregoing protected acid group, the foregoing basic group, the foregoing protected amino group or the like.

Herein, Examples of a protected acid group that an acid group is esterified being shown in a general formula include $ROC(O)-$, $ROS(O)_2-$, $(RO)(R'O)P(O)-$, and the like. Here, R is an alkyl group having 1 to 20 carbon atoms, or an aryl group having 6 to 20 carbon atoms, and R' is a hydrogen atom, an alkyl group having 1 to 20 carbon atoms, or an aryl group having 6 to 20 carbon atoms.

Examples of a protected acid group that an acid group is amidated being shown in a general formula include $RN(R')C(O)-$, $RN(R')S(O)_2-$, $(RNH)P(O)(OH)-$, $(RNH)_2P(O)-$, and the like, and R and R' are the same meanings as described above.

These protected acid groups can be easily converted into an acid group by hydrolysis.

On the other hand, as an protected amino group that an amino group is amidated, it is shown in $RCON(R')-$, and R and R' are the same definition as the above-described protected acid group. These protected amino groups can also be easily converted into an amino group by hydrolysis.

In the general formula (1), m is a degree of polymerization of a structural unit constituting the segment, and is an integer of 5 or more. In this way, when m is 5 or more, a function on the segment 1 in an aromatic block copolymer tends to be exhibited. The preferable range of m is 5 to 1000, further preferably 10 to 1000, and particularly preferably 20 to 500. Since an aromatic block copolymer with the degree of polymerization of the segment represented by the general formula (1) in the above-described range tends to exhibit the function of the segment, it can be applied to various functional materials, providing industrially useful materials. For production of such aromatic block copolymer, the decomposition method of the present invention can provide a suitable analysis method in quality control on its industrial production.

As a structural unit constituting a polyarylene segment represented by the above-described general formula (1), for example, the following (1-1) to (1-3) are listed, and a segment obtained by linking m of such structural units is listed.

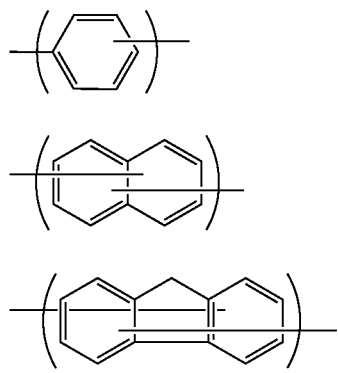

1-1

1-2

1-3

Such structural unit may have a substituent in its aromatic ring as described above, and the substituent, includes a substituent exemplified as that of the foregoing Ar¹. When the aromatic ring has a substituent, the substituent is preferably an aromatic group, and the following (1-4) to (1-19) are listed.

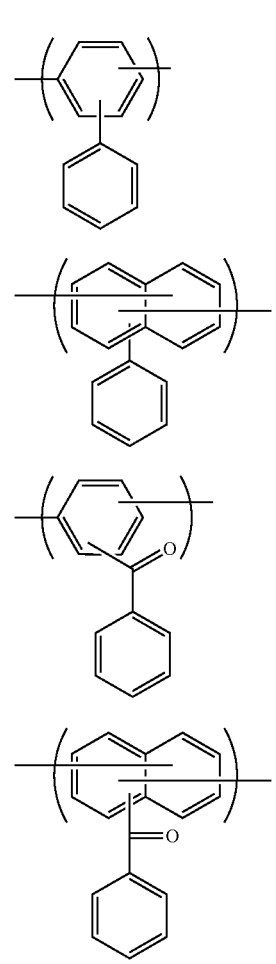

1-4

1-5

1-6

1-7

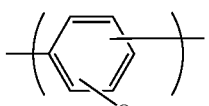

1-8

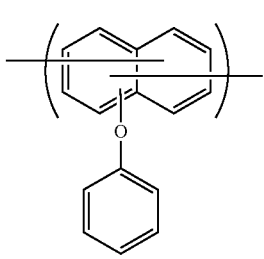

1-9

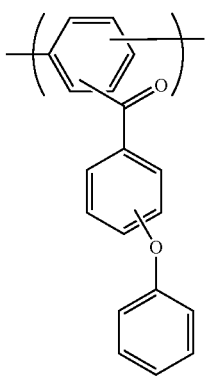

1-10

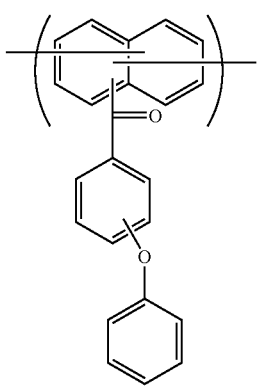

1-11

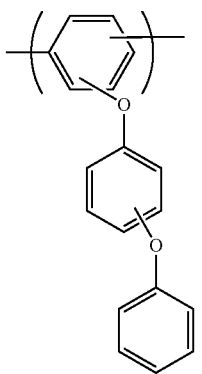

1-12

1-13
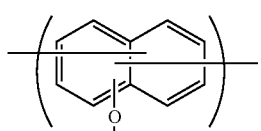
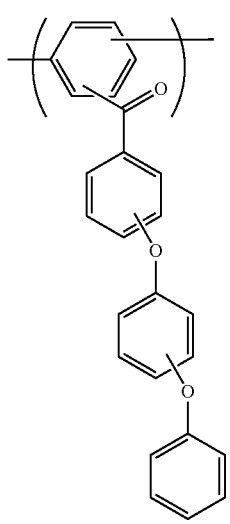
1-14
1-15
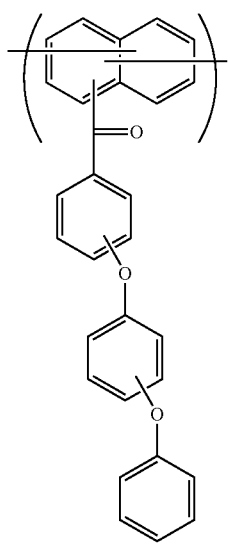
1-16
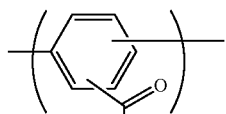
1-17
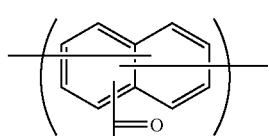
1-18
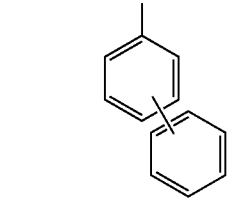
1-19
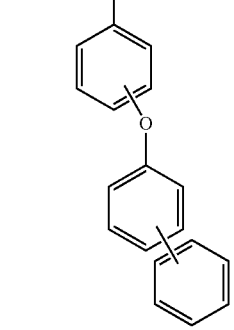

Additionally, in a structural unit of the above-described (1-4) to (1-19), an aromatic group of side chain may further have a substituent in a range of the total carbon numbers being not more than 20.

Next, the segment 2 in an aromatic block copolymer applied to the present invention is explained.

The segment 2 is a segment easily decomposable in a chemical decomposition described below, and is an aromatic polymer segment wherein aromatic rings of a main chain constituting the aromatic block copolymer are linked by a polyalkylene chain or a divalent group contributing to decomposition. Thus, for the aromatic block copolymer to function as a functional polymer film, mechanical strength that can maintain a shape as film is necessary, an aromatic block copolymer comprising the segment 1 represented by the general formula (1) and the segment 2 comprising a structural unit represented by the following general formula (2) and/or a structural unit represented by the following general formula (3) is excellent in the mechanical strength and has been applied to various industrial applications.

  (2)

  (3)

(wherein $Ar^{10}$, $Ar^{20}$ and $Ar^{21}$ each independently represent a divalent aromatic group that may have a substituent. $X^{10}$ and $X^{20}$ each independently represent an oxygen atom, a sulfur atom, an alkylene group having 1 to 10 carbon atoms or a fluorine-substituted alkylene group having 1 to 10 carbon atoms, and $Y^{20}$ represents a sulfonyl group, a carbonyl group or a fluorine-substituted alkylene group having 1 to 20 carbon atoms.)

Here, a specific example of $Ar^{10}$, $Ar^{20}$ and $Ar^{21}$ is the same example as that of $Ar^1$ of the above-described general formula (1), and the substituent is also the same example.

$X^{10}$ and $X^{20}$ each independently represent an oxygen atom forming an ether bond, a sulfur atom forming a thioether bond, an alkylene group having 1 to 10 carbon atoms or a fluorine-substituted alkylene group having 2 to 10 carbon atoms. Examples of the alkylene group include a methylene group, ethylene group, propylene group, isopropylidene group, 2,2-butylidene group, hexylene group, octylene group, decylene group, cyclohexylene group, adamantane-diyl group etc., and as the fluorine-substituted alkylene group, there are listed a difluoromethylene group, tetrafluoroethylene group, hexafluoroisopropylidene group and octafluoro-2,2-butylidene group etc.

As a specific example of the structural unit represented by the general formula (2) that is a structural unit constituting the segment 2, the following (2-1) to (2-27) are listed.

2-1
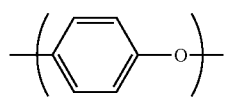

2-2
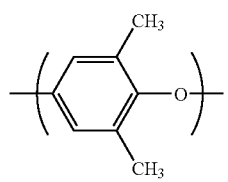

2-3
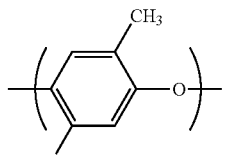

2-4
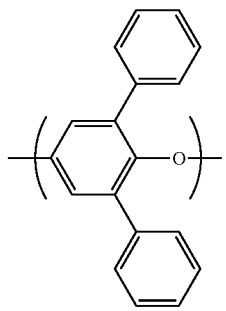

2-5
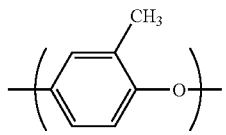

2-6
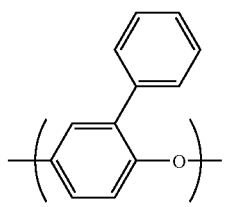

2-7
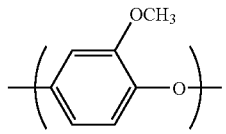

2-8
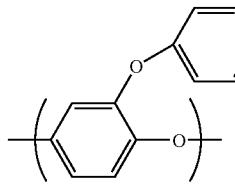

2-9
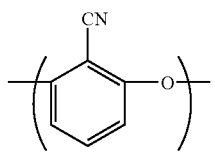

2-10
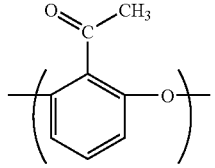

2-11
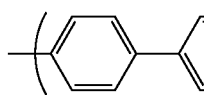

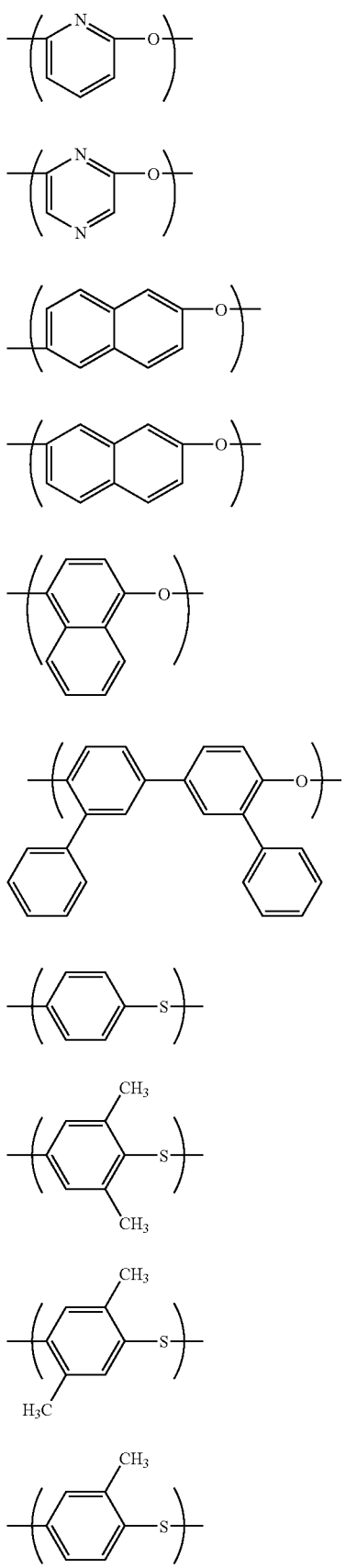
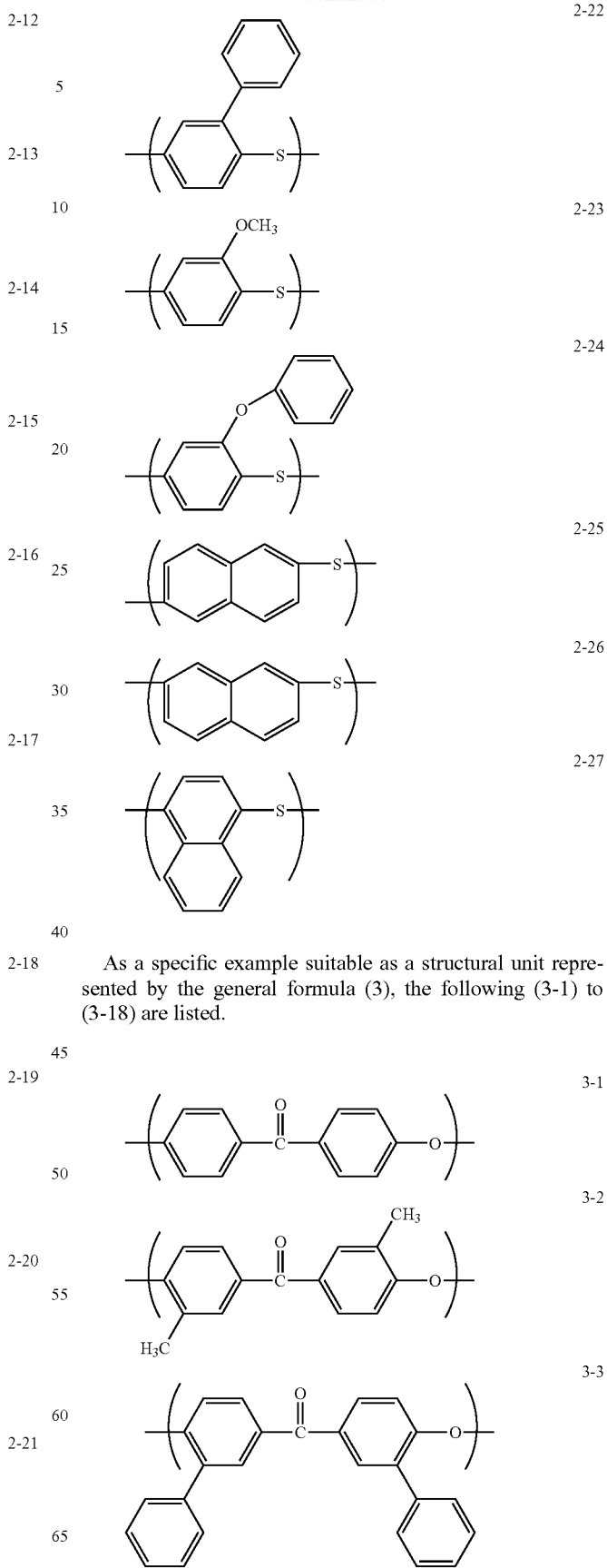
As a specific example suitable as a structural unit represented by the general formula (3), the following (3-1) to (3-18) are listed.

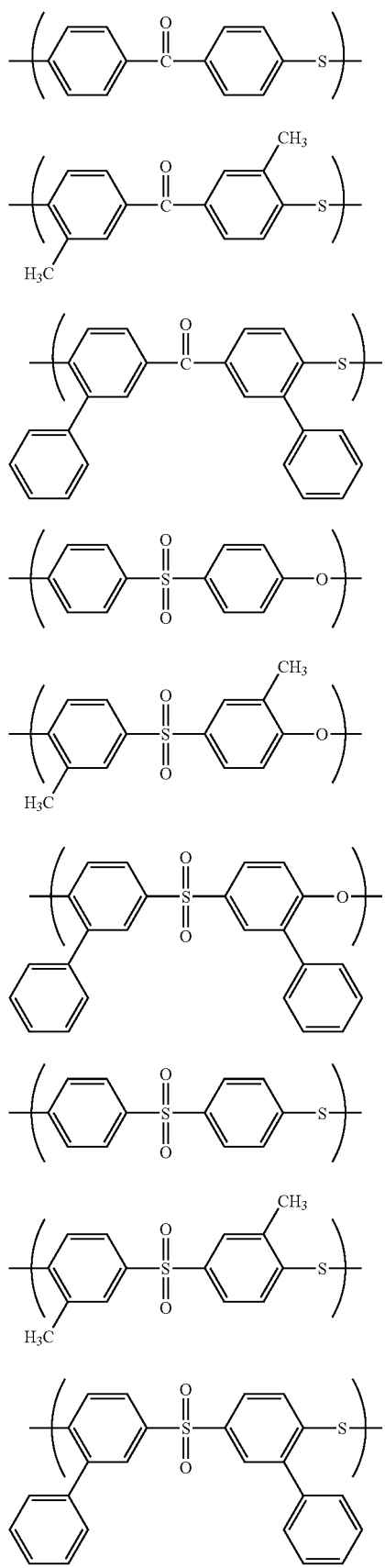
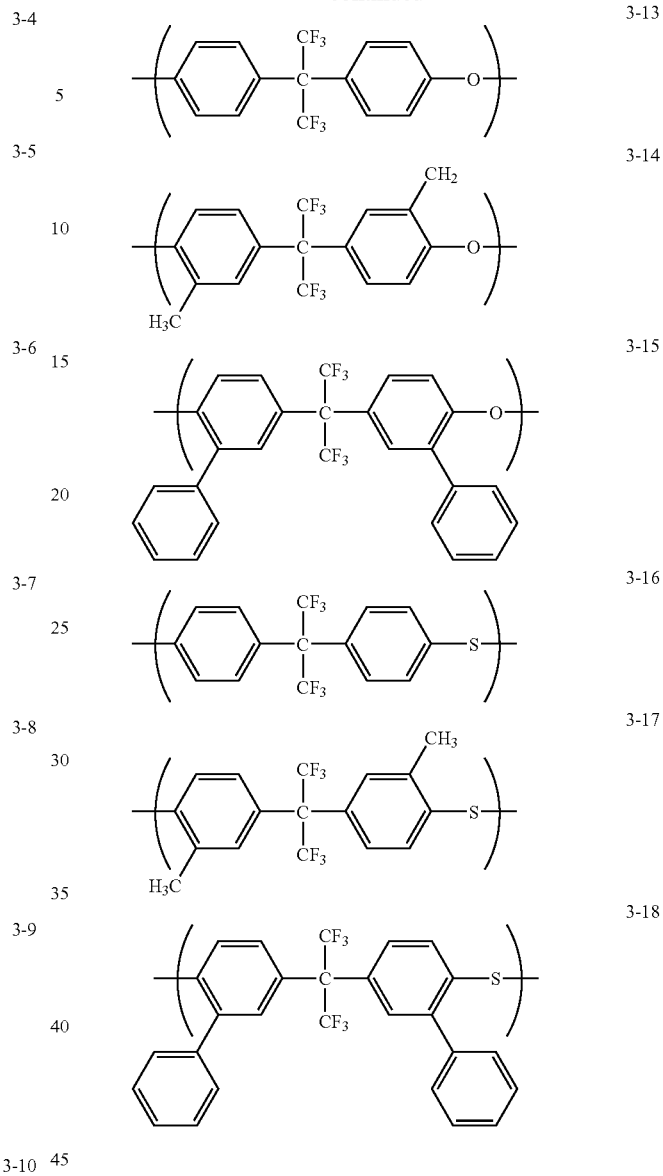

The segment 2 is the segment obtained by linking the plurality of the structural units exemplified in the above (2-1) to (2-27), or (3-1) to (3-18). When the degree of polymerization of the segment 2 is 5 or more, it is industrially useful because it easily exhibits a function on the other segment in a block copolymer, a range of 5 to 1000 is preferable. Further, the degree of polymerization of the segment 2 is preferably in the range of 5 to 500, and particularly preferably in the range of 10 to 200. An aromatic block copolymer with the degree of polymerization in the above-described range is excellent in mechanical strength, it is industrially useful for an application of functional polymer films, and the decomposition method of the present invention can suitably be used the quality control analysis on production of the aromatic block copolymer.

Further, as the other segment described above, it may be a mode of a copolymer of the general formula (2) and general formula (3), and for example, a segment comprising a structural unit represented by the general formula (4) is listed.

$$-(Ar^{20}-Y^{20}-Ar^{21}-X^{20}-Ar^{10}-X^{10})-\qquad(4)$$

(wherein $Ar^{10}$, $Ar^{20}$, $Ar^{21}$, $X^{10}$, $X^{20}$ and $Y^{20}$ are the same meanings as described above.)

As a specific example of the structural unit represented by the general formula (4), the following (4-1) to (4-16) are listed.

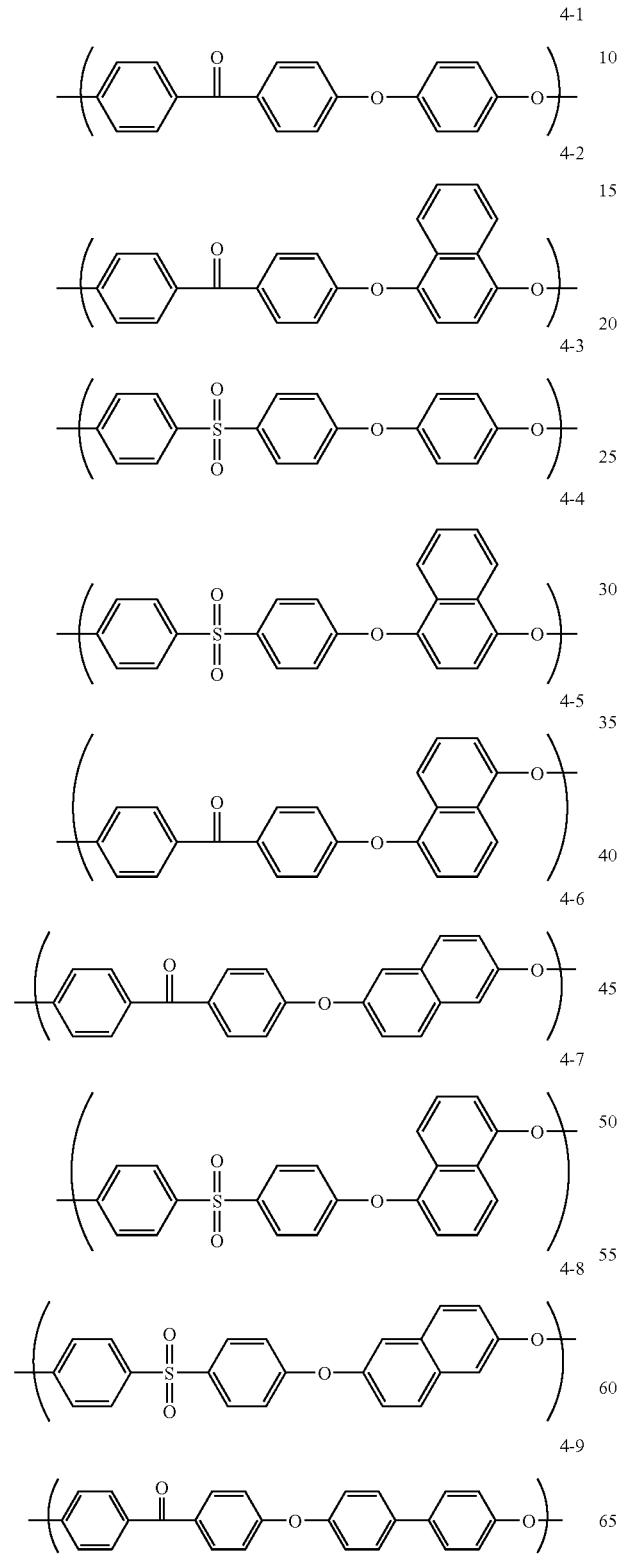

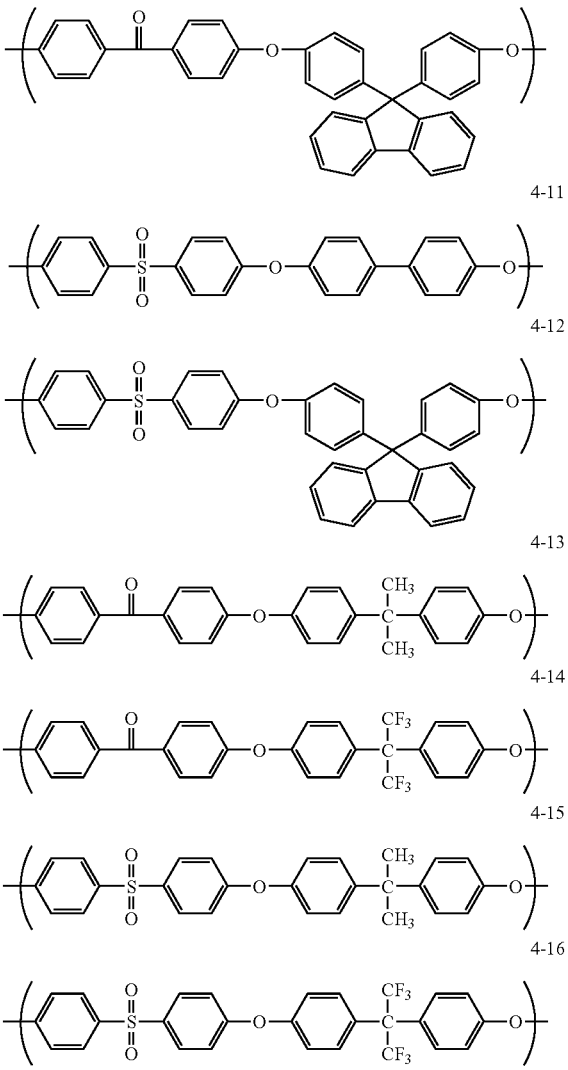

The degree of polymerization of the structural unit is preferably in the range of 3 to 500, and particularly preferably in the range of 5 to 200.

Among aromatic block copolymers applied to the present invention, an aromatic block copolymer having an ion-exchange group is applied to an ion-exchange material, an ion conducting material, a separation material such as separation membrane and the like, it is particularly useful industrially. Herein, as the ion-exchange group, in addition to the above-described acid group and basic group, examples thereof include the above-described protected acid group and protected amino group convertible into the acid group and the basic group. Above all, when the ion-exchange group is an acid group or a protected acid group, it is useful as an ion-conducting membrane material for a polymer electrolyte fuel cell whose development is activated in recent year, or its precursor, and the decomposition method of the present invention can provide an analysis method of the aromatic block copolymer, particularly, an analysis method suitable for material evaluations for development of the above-described ion-conducting membrane as well as for quality control in the industrial production.

The above-described ion-exchange group is not particularly limited, for example, there are listed a cation exchange group such as —SO₃H, —COOH, —PO(OH)₂, —SO₂NHSO₂—, -Ph(OH), (Ph represents a phenylene group); and an anion exchange group such as —NH₂, —NHR, —NRR', —N⁺RR'R", —NH₃⁺, (R, R' and R" each independently represent an alkyl group, a cycloalkyl group, or an aryl group). Above all, a cation exchange group is preferable, and —SO₃H (sulfonic acid group) is particularly preferable. These groups may form a salt with a counter ion in a part or all thereof.

When an aromatic block copolymer has an ion-exchange group, in particular, a block copolymer with a segment having an ion-exchange group and a segment having substantially no ion-exchange group, generates phase separation of the segment units when it is formed in a film, for example, giving a film having a dense domain of ion-exchange groups and a poor domain thereof, which expects various functions. As the aromatic block copolymer, combinations of the following segments are listed.

(i) A block copolymer comprising the segment 1 represented by the general formula (1) and having an ion-exchange group, and the segment 2 which comprises the structural unit represented by the general formula (2) and having substantially no ion-exchange group.

(ii) A block copolymer comprising the segment 1 represented by the general formula (1) and having an ion-exchange group, and the segment 2 which comprises the structural unit represented by the general formula (3) and having substantially no ion-exchange group.

(iii) A block copolymer comprising the segment 1 represented by the general formula (1) and having an ion-exchange group, and the segment 2 which comprises the structural unit represented by the general formula (4) and having substantially no ion-exchange group.

(iv) A block copolymer comprising the segment represented by the general formula (1) and 1 having substantially no ion-exchange group, and the segment 2 which comprises the structural unit represented by the general formula (2) and having an ion-exchange group.

(v) A block copolymer comprising the segment 1 represented by the general formula (1) and having substantially no ion-exchange group, and the segment 2 which comprises the structural unit represented by the general formula (3) and having an ion-exchange group.

(vi) A block copolymer comprising the segment 1 represented by the general formula (1) and having substantially no ion-exchange group, and the segment 2 which comprises the structural unit represented by the general formula (4) and having an ion-exchange group.

Additionally, in an exemplification of the combination, "a segment having an ion-exchange group" means that the number of the ion-exchange group is 0.5 or more per one structural unit constituting such a segment. On the other hand, "a segment having substantially no ion-exchange group" means that the number of the ion-exchange group is 0.1 or less per one structural unit constituting such a segment.

Among the above-described combinations, preferable is an aromatic block copolymer having an ion-exchange group in the segment 1 represented by the general formula (1) shown in (i), (ii) or (iii). In this way, an aromatic block copolymer having an ion-exchange group that can provide a polyarylene segment with a function such as ion-exchange function or ion conducting function is excellent in chemical stability or mechanical strength, and becomes useful industrially.

Among the segments 1 represented by the general formula (1), a specific example of the segment having an ion-exchange group include a segment having a structural unit represented by the following (i-1) to (i-11). Q represents an ion-exchange group, a protected acid group and a protected amino group that can become an ion-exchange group (hereinafter, a protected acid group and a protected amino group are collectively referred to as "a protected ion-exchange group"), a group having an ion-exchange group, and a group having a protected ion-exchange group.

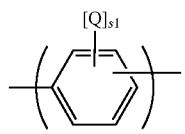

i-1

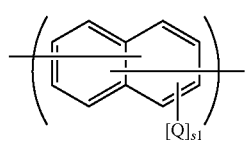

i-2

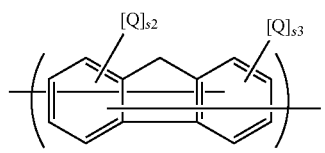

i-3

(wherein Q is the same meaning as described above, when Q is plurally present in a structural unit, Qs may be the same as or different from each other, s1 is 1 or 2, s2 and s3 represent an integer of 0 or more, 2 or less, and s2+s3 is an integer of 1 or more.)

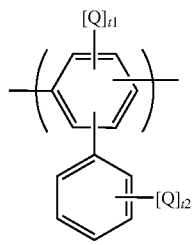

i-4

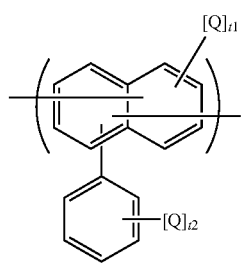

i-5

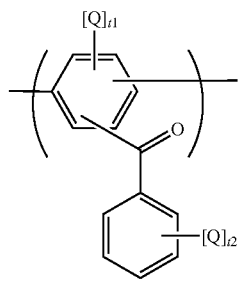

i-6 i-7

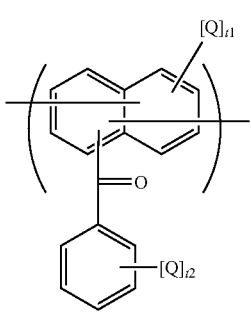

i-8

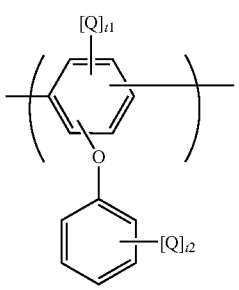

i-9 i-10

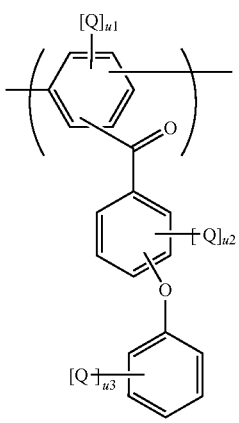

i-11

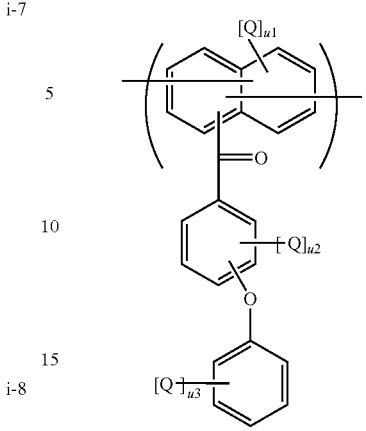

(wherein Q is the same meaning as described above, t1 and t2 represent an integer of 0 or more and 2 or less, and t1+t2 is an integer of 1 or more).

(wherein Q is the same meaning as described above, u1, u2 and u3 represent an integer of 0 or more and 2 or less, and u1+u2+u3 is an integer of 1 or more).

For Q on the structural unit represented by the above-described (i-1) to (i-11), as a group having an ion-exchange group and a group having a protected ion-exchange group, for example, the following groups can be listed.

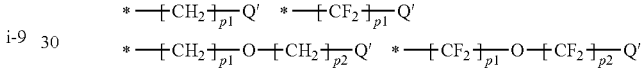

(wherein Q' is an ion-exchange group or a protected ion-exchange group, p1 and p2 are an integer of 6 or less, and * represents a bindable hand).

Next, chemical decomposition of an aromatic block copolymer is explained.

Herein, "chemical decomposition" is defined in a wide concept as "method for converting a polymer compound into low molecular substances by selectively cutting off a reactive part and a weak-bonding part in the structure through hydrolysis reaction or oxidative decomposition reaction" described in "Chemical Dictionary (popular edition) edited by Seiji Shida, published by Morikita Publishing Co., Ltd. in 1985," but there is almost no example wherein the chemical decomposition is applied to an aromatic block copolymer. The present inventors have found the following: regarding the aromatic block copolymer having the segment 1 represented by the general formula (1) and the other segment (segment 2), which is used as a functional polymer material, chemical decomposition using a specific reactant can be applied to an analysis method providing information of good reproducibility about the chain length of the segment and the component ratio of the segment weight for each segment on the aromatic block copolymer. That is, when the chemical decomposition is used in the aromatic block copolymer having the segment 1 and segment 2, it becomes possible to selectively decompose the segment 2 reproducibly, and such decomposition method is very useful for obtaining the structural information of the aromatic block copolymer, and applying such decomposition method to an analysis method is based on the present inventors' own knowledge.

As a reactant used in chemical decomposition, acid, alkali, alcohol or the like is listed.

The acid includes strong acids such as hydrochloric acid and nitric acid, the alkali includes caustic soda and amines, the alcohol includes methanol and ethanol, above all, alkali (basic compound) is suitable from the viewpoints of high reactivity and high selectivity.

Among the alkalis, amines are particularly preferable. The present inventors have found the following: when the amines are used, in an aromatic block copolymer suitable in the above-described application of functional polymer films, the segment 1 represented by the general formula (1) is hard to be decomposed, and therefore the segment 2 comprising the structural unit represented by the general formula (2), the general formula (3) or the general formula (4) can be selectively decomposed, and structural information on the segment represented by the general formula (1) is easily obtained in such block copolymer.

When the chemical decomposition using the amines is applied to the above-described aromatic block copolymer, a weight ratio of the hardly decomposable segment 1 represented by the general formula (1) to the easily decomposable segment 2 comprising the structural unit represented by the general formula (2), the general formula (3) or the general formula (4) can also be obtained.

Herein, as the amines, for example, secondary amines are preferable such as dibutylamine, dipropylamine, diphenylamine, pyrrolidine, piperazine, piperidine, morpholine and imidazoline, above all, cyclic secondary amines typified by pyrrolidine, piperazine and piperidine are preferable.

In this way, the reason that secondary amines, particularly cyclic secondary amines are preferable is not certain, but it is assumed that a nitrogen atom of secondary amine has the state of unpaired electron occupying a preferable state for nucleophilic reaction due to electron donating ability of an alkyl group, and when it is cyclic, a steric effect further operates.

Reaction conditions on the above-described chemical decomposition are specifically explained.

In determining a reaction temperature, it is determined out of consideration to thermal stability of a target aromatic block copolymer and the like.

That is, the decomposition method of the present invention is achieved by selectively decomposing one segment of an aromatic block copolymer by means of the above-described chemical decomposition, and polymer decomposition involved in thermal decomposition should be avoided as much as possible. In regard to such thermal decomposition, for example, a target aromatic block copolymer is subjected to differential thermal/thermogravimetric measurement (TG-DTA) beforehand to determine a decomposition temperature on thermal decomposition, and the decomposition temperature is set to the upper limit of a reaction temperature in the chemical decomposition.

In regard to the lower limit of reaction temperature, it can be arbitrarily changed depending on a target aromatic block copolymer and the kind of reactant used, but when the reaction temperature is very low, the chemical decomposition tends to take a long time, thus it is necessary to consider both of the reaction temperature and the reaction time. Generally, the reaction time is preferably one minute to 24 hours, when used as a quality control analysis, and the reaction temperature is determined so that the chemical decomposition is finished within such a range. As a method to determine the reaction temperature, an exploratory experiment is preferably carried out, and it is possible to determine the reaction time and reaction temperature of the chemical decomposition by determining the terminal point that the reaction becomes constant through monitoring the chemical reaction with time. Herein, as the monitoring method, size exclusion chromatography (hereinafter called "SEC") can be suitably used. Additionally, a specific method on SEC will be described below.

In this way, it is possible to optimize the reaction time and reaction temperature, generally, the reaction temperature is 0 to 200° C., preferably 50 to 180° C., and particularly preferably 80 to 150° C., the reaction time is preferably 10 minutes to 20 hours, and particularly preferably 10 minutes to 15 hours.

Next, a reaction solvent in the above-described reaction conditions is explained.

The chemical decomposition may be conducted in the presence of a solvent or in the absence thereof, but it is preferable to use a solvent from the point that chemical decomposition reaction generally becomes more reproducible.

Such a solvent is suitably a solvent which solves without causing a side reaction of a target aromatic block copolymer and a decomposer. When a boiling point of the solvent is higher than a temperature required for the above-described chemical decomposition, chemical decomposition can be conducted under normal pressure (about 1 atmospheric pressure) or under pressure. Operation under pressure is preferable from the point of reactivity, and operation under normal pressure is preferable because of simplicity in equipment. When the chemical decomposition is performed under normal pressure, low molecular components in the decomposed matter obtained and high molecular components having hardly decomposable segment 1 represented by the general formula (1) are each separated after conducting chemical decomposition, and then, they may be subjected to an analysis described below. In this case, a sample is concentrated after completion of chemical decomposition, when separation and purification is conducted, a low boiling point is preferable from the point of easy concentration, so a solvent with such a boiling point is suitable.

As a specific example of solvent, for example, it can be selected in a range not deactivating a reactant used in the above-described chemical decomposition, from aprotic polar solvents such as N,N-dimethylformamide, N,N-dimethylacetamide, N-methyl-2-pyrrolidone and dimethylsulfoxide; chlorine type solvents such as chloroform, 1,2-dichloroethane, chlorobenzene and dichlorobenzene; alcohols such as methanol, ethanol and propanol; and alkylene glycol monoalkyl ether such as ethylene glycol monomethyl ether, ethylene glycol monoethyl ether, propylene glycol monomethyl ether and propylene glycol monoethyl ether. These solvents can be used alone, and in mixture of two kinds or more of solvents, if necessary. Above all, dimethylformamide, dimethylacetamide, N-methyl-2-pyrrolidone and dimethylsulfoxide are preferable because of high solubility of aromatic block copolymer applied to the present invention.

Regarding distinction between the "low molecular component" and "high molecular component" obtained by the above-described chemical decomposition, in an analysis by the foregoing SEC, a retention time of equivalent molecular weight of 1000 is set to a base point, and a component detecting a peak top in a retention time earlier than the point is defined as "a high molecular component," and a component detecting a peak top in a retention time later than the point is defined as "a low molecular component." Additionally, as a standard sample of molecular weight to obtain a equivalent molecular weight in the SEC analysis, as described below, a suitable one can be used each depending on that SEC is a nonaqueous system or an aqueous system.

As described above, after conducting chemical decomposition of the aromatic block copolymer, by analyzing high molecular components after treatment, it is possible to identify structural information on the segment of hardly decomposable segments including segment 1 represented by the general formula (1). Since the chemical decomposition of the present invention gives a result of good reproducibility, it can be used suitably as a quality control method.

In particular, as an analysis technique for the above-described high molecular components, it is suitable to conduct a molecular weight analysis using SEC.

Of the molecular weight analyses, a method using SEC can analyze structural information of the high molecular components, without purification operation after treatment by the above-described chemical decomposition (hereinafter sometimes called "chemical decomposition treatment"), by separating the low molecular components and high molecular components, which is preferable because of more simplicity. In this way, the method using SEC can skip a purification operation, and when the low molecular components generated in chemical decomposition treatment are removed, it is more preferable from the viewpoint of obtaining reproducibility. As the purification method, the well-known means such as washing with solvents, liquid-liquid extraction method, separation by adsorption/distribution chromatography and distillation, and can be used in combination of these means. Above all, in the case where the low molecular component and high molecular component have different solubility in a solvent, washing with a solvent and liquid-liquid extraction method are particularly preferable from the point capable of doing purification simply and surely.

As a specific condition of SEC, the most suitable one applied from known techniques for an aromatic block copolymer can be obtained. As a standard sample of molecular weight in measuring a number-average molecular weight, there can be used polystyrene in the case that SEC is a non-aqueous system (for example, a tetrahydrofuran solvent etc.), and glycols such as polyethylene glycol and polypropylene glycol in the case that SEC is an aqueous system, and these standard samples for molecular weight of SEC are easily available from the market.

As a detector applied to SEC, various optimizations are possible depending on aromatic block copolymers used, in addition to an ultraviolet-absorption detector and a differential refractive index detector generally used, an absolute molecular weight can also be obtained by using a light scattering detector and a viscosity detector.

When SEC is used, it becomes possible to obtain a weight-average molecular weight (Mw) and a number-average molecular weight (Mn) at the same time as structural information of high molecular components, and when a polydispersity represented by Mw/Mn is obtained, this becomes a suitable index as a quality control analysis on the industrial production of the aromatic block copolymer among the analysis methods provided by the present invention. That is, structural information on distribution of the segment 1 represented by the above-described general formula (1) present in an aromatic block copolymer which is excellent in chemical stability and mechanical strength is useful information to obtain characteristics of the aromatic block copolymer stably, in particular, the aromatic block copolymer having an ion-exchange group in the segment 1 represented by the general formula (1) as described above, and controlling the above-described Mw/Mn is particularly useful as an analysis method controlling the quality of the aromatic block copolymer.

In this way, using SEC is preferable because it becomes possible to measure Mw and Mn at the same time in obtaining Mw/Mn, but it is also possible to adopt a method for measuring a molecular weight other than SEC. For example, an ultracentrifugal method capable of obtaining Mw, a mass spectrometry or a vapor pressure method capable of obtaining Mn are listed, and Mw/Mn can be also calculated from Mw and Mn obtained by using these analysis methods.

In the case where high molecular components including the segment 1 represented by the general formula (1) which is present in an aromatic block copolymer, have an ion-exchange group, since they often solve in water, it is preferable that a mobile-phase solvent containing water is used in SEC measurement, a polyethylene oxide standard product is used at a high molecular weight side and a polyethylene glycol standard product is used at a low molecular weight side to calculate a polydispersity (Mw/Mn).

The method using SEC is a method whose analysis target is a high molecular component mainly after chemical decomposition, but it is also possible to analyze a structure of unknown samples of aromatic block copolymer by a concomitant use of other analysis method.

For example, regarding a method for analyzing high molecular components having a hardly decomposable segment after chemical decomposition, a nuclear magnetic resonance method (NMR) and mass spectroscopy may be used, above all, when the high molecular components are soluble in a solvent, the NMR method and matrix-assistant laser desorption mass spectrometry (MALDI-TOMS method) are particularly useful because detailed structural information is obtained.

The low molecular weight components obtained by chemical decomposition can be analyzed by separation methods such as liquid chromatography and gas chromatography; and can be also analyzed by gas chromatography-mass spectroscopy and liquid chromatography-mass spectroscopy capable of identifying decomposed products separated by the separation analysis.

In this way, it is also possible to figure out the detail on the structure of aromatic block copolymer by obtaining the structural information of high molecular components, or obtaining the information of low molecular weight components, and it is also possible to design a functional polymer by comparing the analysis data on structures with the performances of the aromatic block copolymer.

In analyzing a polydispersity of high molecular components including the segment 1 represented by the above-described general formula (1) by selectively decomposing segment 2 which is present in an aromatic block copolymer using the decomposition method of the present invention, an aromatic block copolymer that the segment 2 is decomposed by 90% by weight or more to the total weight of the segment 2 which is present in the aromatic block copolymer, and a polydispersity (Mw/Mn) of the residual high molecular components of decomposed matter determined by analysis with the above-described SEC of 7.0 or less, is very preferable because it can be applied to various applications. In the case where the polydispersity (Mw/Mn) is more than 7.0, when it is used as a molded article, it tends to become a molded article forming a large aggregation phase, and there is a tendency that such molded article is difficult to produce while stabilizing the quality.

Additionally, to decompose 90% by weight or more of the segment 2 to the total weight, it is achieved by chemical decomposition excessively using an organic amine, preferably a cyclic organic amine which is shown in the foregoing suitable decomposition method to an aromatic block copolymer to be decomposed. In this case, it is preferable that a reaction time for chemical decomposition is longer. Further, to confirm the decomposition ratio of such a segment 2, an index may be used as follows: the decomposed matter is measured by nuclear magnetic resonance ($^1$H-NMR), an arbitrary hydrogen atom is chosen as a base from the structural unit represented by the above-described general formula (2) or the structural unit represented by the general formula (3) constituting segment 2, in an integrated value of protons based on the hydrogen atom, a reduction rate in the integrated value of protons before and after conducting the decomposition method of the present invention is 90% or more.

Next, SEC for obtaining a polydispersity on high molecular components of decomposed matter after segment 2 is decomposed, will be detailed.

Additionally, as a detector of the SEC, in the case where $Ar^1$s of the segment 1 are the same aromatic group, a visible-ultraviolet absorption meter or a differential refractometer is used. In the case where a solution concentration of SEC measurement is very dilute, there is a merit of high sensitivity when a visible-ultraviolet absorption meter is used. The visible-ultraviolet absorption can be used in the case where the segment 1 has an absorption maximum from 250 nm to 700 nm, and from the point of sensitivity, it is preferable to select a wavelength to be 80% or more when a molar absorption coefficient of the segment 1 is set at 100% at the maximum value. In the case where $Ar^1$s of segment 1 are different from each other, a differential refractometer is used. In the case that whether $Ar^1$s of segment 1 are the same aromatic group or not is uncertain, a differential refractometer is used.

As described before, since a suitable aromatic block copolymer applied to the decomposition method of the present invention is the aromatic block copolymer, wherein the segment 1 has an ion-exchange group and/or a protected ion-exchange group, high molecular components of decomposed matter including segment 1 as described above generally tend to solve in water.

In this case, a polydispersity is obtained by the following SEC condition 1.

| [SEC condition 1] | |
|---|---|
| Column | α-M (inner diameter 7.8 mm, length 30 cm) manufactured by Tosoh Corporation |
| Colum temperature | 40° C. |
| Mobile-phase solvent | Mixture: 50 mM aqueous ammonium acetate/acetonitrile = 70/30 (volume ratio) |
| Flow rate of solvent | 0.6 mL/min |
| Detection | Visible-ultraviolet absorption Detector or Differential refractometer |
| Sample for molecular weight calculation | Polyethylene oxide (high molecular weight side), Polyethylene glycol (low molecular weight side) |

In the case where high molecular components of decomposed matter including the segment 1 are hardly dissolved or not dissolved in water, a polydispersity is obtained by the following SEC condition 2.

| [SEC condition 2] | |
|---|---|
| Column | TSK-GEL GMHHR-M manufactured by Tosoh Corporation |
| Colum temperature | 40° C. |
| Mobile-phase solvent | Dimethylacetamide or N,N-dimethylformamide (lithium bromide added to be 10 mmol/dm$^3$) |
| Flow rate of solvent | 0.5 mL/min |
| Detection | Visible-ultraviolet absorption Detector or Differential refractometer |
| Sample for molecular weight calculation | Polystyrene |

Additionally, in SEC condition 2, generally a polydispersity becomes almost the same in the cases where the mobile-phase solvents are dimethylacetamide and N,N-dimethylformamide.

Additionally, in the case where high molecular components of decomposed matter including the segment 1 are hardly dissolved or not dissolved in either waters dimethylacetamide or N,N-dimethylformamide, a polydispersity can be obtained by the following SEC condition 3. Further, in the case where high molecular components of decomposed matter including the segment 1 are hardly dissolved or not dissolved in dimethylsulfoamide, a polydispersity can be obtained by the following SEC condition 4.

| [SEC condition 3] | |
|---|---|
| Column | TSK-GEL GMHHR-M manufactured by Tosoh Corporation |
| Colum temperature | 60° C. |
| Mobile-phase solvent | Dimethylsulfoxide (lithium bromide added to be 10 mmol/dm$^3$) |
| Flow rate of solvent | 0.5 mL/min |
| Detection | Ultraviolet absorption Detector (wavelength 300 nm) |
| Sample for molecular weight calculation | Polymethylmethacrylate |

| [SEC condition 4] | |
|---|---|
| Column | TSK-GEL GMHHR-M manufactured by Tosoh Corporation |
| Colum temperature | 60° C. |
| Mobile-phase solvent | Tetrahydrofuran (lithium bromide added to be 10 mmol/dm$^3$) |
| Flow rate of solvent | 1 mL/min |
| Detection | Ultraviolet absorption Detector (wavelength 300 nm) |
| Sample for molecular weight calculation | Polystyrene |

In this way, to obtain a polydispersity of high molecular components including the segment 1, SEC condition 1 using water as a mobile phase is prioritized, but in the case where the components are hardly dissolved or not dissolved in water, SEC conditions 1 to 4 are determined in accordance with the order previously described by taking solubility in a solvent of mobile phase into accounts.

The analysis method that the present invention provides is able to provide an aromatic block copolymer promising a high mechanical strength.

That is, when a polydispersity (Mw/Mn) of high molecular components including the segment 1 represented by the above-described general formula (1) which is present in an aromatic block copolymer, is obtained by using the analysis method of the present invention, since in an aromatic block copolymer with a polydispersity of 5.0 or less, the segment 1 promising a high mechanical strength is present in an almost uniform composition in the block copolymer, for example, when the a block copolymer is formed in a film, a domain size comprising the segment 1 capable of exhibiting a high mechanical strength becomes more uniform, and such a film can be excellent in mechanical strength. In this case also, SEC condition for analyzing high molecular components of decomposed matter is the same as above.

As a method for obtaining an aromatic block copolymer showing such polydispersity, it is not particularly limited, and it is conducted by a commonly used method such as polymerization in a state that a relatively good solubility is maintained. As a method ensuring such good solubility, for example, generally used methods such as a method selecting a good solvent common to polymers and monomers present in polymerization and a method keeping a reaction concentration low, are listed.

Further, as a method for obtaining an aromatic block copolymer showing such polydispersity, in producing an aromatic block copolymer by bonding a precursor inducing the segment 1 represented by the above-described general formula (1) (polyarylene segment precursor) with the other segment (segment comprising structural unit represented by the above-described general formula (2) and/or structural unit represented by the above-described general formula (3)), after the polydispersity of the polyarylene segment precursor itself is set to 7.0 or less, or 5.0 or less by a known technique, it can be easily produced by a method bonding a precursor inducing the other segment. As a technique of setting the polydispersity to 7.0 or less, or 5.0 or less, and examples thereof include a method fractionating polyarylene segment precursor by molecular weight such as reprecipitation method, chromatographic separation method or membrane separation method. An aromatic block copolymer obtained by bonding the polyarylene segment precursor which is subjected to molecular weight fractionation with a precursor inducing the other segment is a functional polymer material promising a high strength, and the decomposition method of the present invention and an analysis method using the decomposition method can be suitably used to design such functional polymer material.

As a method for obtaining an aromatic block copolymer showing a specific polydispersity as described above, there are listed a method for obtaining it by synthesizing a desired copolymer through control of synthesis reaction, and a method for obtaining it by fractionating an aromatic block copolymer into the only desired copolymer through molecular weight fractionation etc., and these methods may be conducted alone or in combination thereof.

A method for producing a film comprising an aromatic block copolymer showing such polydispersity is not particularly limited, and examples thereof include a method of forming a film from solution state (solution casting method), a T-die method of extruding and winding a copolymer in solution state or melt state from a T-die, a method extruding and winding a copolymer in solution state or melt state from an extruder equipped with a circular die, a hot press method, a forming method using a calender or roll. Above all, a method of forming a film from solution state (solution casting method) and a T-die method of extruding and winding a copolymer in solution state or melt state from a T-die, are preferably used.

Specifically, the aromatic block copolymer is dissolved in a suitable solvent, the solution is cast-coated on a glass plate etc., and the solvent is removed to form a film. The solvent used for film-forming is not particularly limited as long as it can dissolve the aromatic block copolymer and can be removed afterward, preferably used are aprotic polar solvents such as N,N-dimethylformamide (DMF), N,N-dimethylacetamide (DMAc), N-methyl-2-pyrrolidone (NMP) and dimethylsulfoxide (DMSO); chlorinated solvents such as dichloromethane, chloroform, 1,2-dichloroethane, chlorobenzene and dichlorobenzene; alcohols such as methanol, ethanol and propanol; alkylene glycol monoalkyl ether such as ethylene glycol monomethyl ether, ethylene glycol monoethyl ether, propylene glycol monomethyl ether and propylene glycol monoethyl ether, or water. These can be used alone, or in mixture of two kinds or more of solvents, if necessary. Taking environments into consideration, aprotic polar solvents, alcohols, alkylene glycol monoalkyl ether or water is more preferably used. Above all, N,N-dimethylformamide (DMF), N,N-dimethylacetamide (DMAc), N-methyl-2-pyrrolidone (NMP), or dimethylsulfoxide (DMSO) is further preferable because of high solubility of polymer.

The thickness of a film is not particularly limited, but it is preferably 10 to 300 μm, and particularly preferably 20 to 100 μm. When a film is too thin, there is a case that a practical strength is not sufficient. When a film is too thick, film resistance becomes large, and therefore, characteristics may be lowered when used in electrochemical devices. The thickness of a film can be controlled by a solution concentration and a coating thickness onto a substrate.

For the purpose of improving various physical properties of film, plasticizers, stabilizers, mold lubricants and the like ordinarily used for polymers can be used. It is also possible to compound the other polymer with the aromatic block copolymer of the present invention by a method of mixing and solving them and co-casting them. Further, inorganic or organic fine particles can be added as a water retention agent. These well-known methods each can be used in a range of not largely deteriorating a target characteristic.

The film of the present invention may be a porous body or a dense film, may be a composite with a support. The support is not particularly limited, may be inorganic materials such as metal and glass, organic materials such as polymer, a composite or laminate thereof, and a part or all thereof may be a porous body.

A method for producing fiber comprising the aromatic block copolymer showing the polydispersity is not particularly limited, but a spinning method from a solution state is preferably used.

Specifically, the aromatic block copolymer is dissolved in a suitable solvent, the solution is extruded through thin nozzles, and the solvent is removed for spinning. The solvent used in spinning is not particularly limited as long as it can dissolve the aromatic block copolymer and can be removed afterward, and it can be selected in the same manner as in the film-forming described above.

A method for producing a hollow body comprising the aromatic block copolymer showing the polydispersity is not particularly limited, and examples thereof include a blow molding method is listed, and as a shape of the molded article obtained, a bottle, a tank, a pipe, a hollow container, and the like.

A method for producing a bead comprising the aromatic block copolymer showing the polydispersity is not particularly limited, and examples thereof include a spray-dry method wherein the aromatic block copolymer is dissolved in a suitable solvent, and the solution is sprayed in mist and dried immediately, and a method wherein the aromatic block copolymer is dissolved in a suitable solvent, and the solution is added dropwise into a solvent in which the aromatic block copolymer does not solve.

As a catalyst in a catalyst composition containing the aromatic block copolymer showing the polydispersity and a catalyst, it is not particularly limited, well-known catalyst can be used. For example, as a catalyst for fuel cell, a fine particle of platinum is particularly preferable. The fine particle of platinum is often used by being supported with a particulate or fibrous carbon such as active carbon and graphite.

A production method of a catalyst composition containing the aromatic block copolymer showing the polydispersity is not particularly limited, and it can be obtained by dissolving the aromatic block copolymer in a suitable solvent and mixing a catalyst with this solution.

Hereinafter, the present invention is explained in detail by Examples, but the present invention is not limited thereto.

Additionally, measurements of a number-average molecular weight (Mn) and a weight-average molecular weight (Mw) were done by the following conditions, and the polydispersity (Mw/Mn) was calculated. The results of SEC analysis in Examples are described hereinafter, and the conditions are also described respectively.

| [SEC condition A1] | |
|---|---|
| GPC measuring equipment | HLC-8220 manufactured by Tosoh Corporation |
| Column | TSK-GEL GMHHR-M manufactured by Tosoh Corporation |
| Colum temperature | 40° C. |
| Eluent | Dimethylacetamide (lithium bromide added to be 10 mmol/dm³) |
| Flow rate of eluent | 0.5 mL/min |
| Detection | Ultraviolet absorbing detector (wavelength 300 nm) |
| Sample for molecular weight calculation | Polystyrene |

| [SEC condition A2] | |
|---|---|
| GPC measuring equipment | |
| Column | α-M (inner diameter 7.8 mm, length 30 cm) manufactured by Tosoh Corporation |
| Colum temperature | 40° C. |
| eluent | Mixture: 50 mM aqueous ammonium acetate/acetonitrile = 70/30 (volume ratio) |
| Flow rate of eluent | 0.6 ml/min |
| Detection | Ultraviolet absorbing Detector (wavelength 300 nm) |
| Sample for molecular weight calculation | Polyethylene oxide (high molecular weight side), Polyethylene glycol (low molecular weight side) |

Measurement of haze (cloud) of a film was carried out by the following method.

Using a film in dry state and a film in wet state after immersion in water at 80° C. for 10 minutes, and using a direct reading haze computer that a PVDC film was attached on the opening of integrating sphere (manufactured by Suga Test Instruments Co., Ltd.), diffusion reflectance (Td) and linear transmittance (Tp) were measured, and a haze value was calculated by the following formula (1).

$$\text{Haze}(\%) = Td/Tt \ast 100 \quad (1)$$

Tt: Total light transmittance (=Td+Tp)

A haze value becomes large when a large aggregation phase is formed in a film.

EXAMPLE 1

Under argon atmosphere, to a flask equipped with azeotropic distillation equipment, 380 ml of dimethylaulfoxide, 100 mL of toluene, 8.7 g (34.9 mmol) of sodium 2,5-dichlorobenzenesolfonate, and 4.0 g of chloro-teriminal type polyether sulfone (produced by excessive use of bis(4-chlorophenyl) sulfone from bis(4-chlorophenyl)sulfone and bis(4-hydroxyphenyl)sulfone; Mn=$2.1 \times 10^4$, Mw=$4.4 \times 10^4$ [SEC condition 1]), and 14.0 g (89.5 mmol) of 2,2'-bipyridine were added and stirred. Thereafter, the temperature of a bath was raised to 150° C., toluene was heat-distilled away to azeotropically dehydrate water in the system, then cooled down to 65° C. Next, 23.4 g (85.2 mmol) of bis(1,5-cyclooctadiene) nickel (0) was added thereto, and stirred at 80° C. for 5 hours. After being left for cooling, the reaction liquid was poured into a large quantity of 6 mol/L hydrochloric acid to precipitate polymer, and it was separated by filtration. Thereafter, the polymer was repeatedly washed with 6 mol/L hydrochloric acid and filtered several times, then washed with water until the filtrate became neutral, and dried under reduced pressure to obtain 6.6 g of the following target aromatic block copolymer (an aromatic block copolymer of a segment 1 comprising polyphenylenesulfonic acid and a segment 2 comprising a polyether sulfone). This aromatic block copolymer is referred to polymer A. The result of ion-exchange capacity determined by a titration method was 2.6 meq/g.

As the result that polymer A was analyzed by SEC condition A1, the number-average molecular weight (Mn) was $6.9 \times 10^4$, and the weight-average molecular weight (Mw) was $1.3 \times 10^5$.

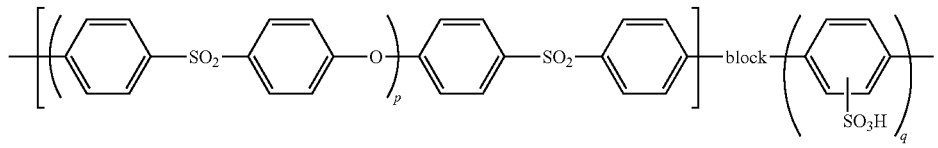

To a flat bottom flask, 100 mg of the polymer A, 15 ml of N,N-diemthylformamide and 5 ml of piperidine were added, which were heat-refluxed in a sand bath for 12 hours after being equipped with a reflux condenser. Thereafter, the content was transferred to a pear-shaped flask while being washed with N,N-dimethylformamide, and concentrated by an evaporator, then added dropwise in a 200 ml beaker where acetone of 100 ml was stirred with a stirrer using a Pasteur pipette. The slurry obtained was subjected to suction filtration using a filter with 0.45 μm diameter made of PTFE.

The residue on the filter was dried, and a part of the solid content obtained was dissolved in ion-exchanged water to be 0.05% (w/v), which was used as a sample for SEC measurement. The polydispersity (Mw/Mn) is determined to be 4.0 by analysis in SEC condition A2.

EXAMPLE 2

Using a reaction container replaced with nitrogen, 11.0 g of anhydrous nickel chloride and 110 g of dimethylsulfoxide were mixed, the temperature was raised to 70° C. and stirred for 2 hours. This was cooled to 50° C., 14.5 g of 2,2-bipyridine was added, and stirred at the same temperature for 10 minutes to prepare a nickel-containing solution.

Using a reaction container replaced with nitrogen, 4.94 g of SUMIKAEXCEL PESS200P shown in the following formula:

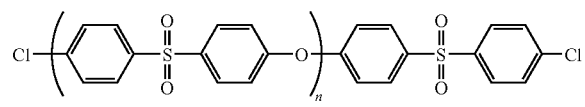

(manufactured by Sumitomo Chemical Co., Ltd.; Mw=63,000, Mn=30,000: [SEC condition 1]) and 150 g of dimethylsulfoxide were mixed, the temperature was raised to 70° C. and stirred for 1 hour. After cooling, 10.0 g of 2,2-dimethylpropyl 2,5-dicyclobenzenesulfonate and 8.3 g of zinc powder were added to prepare a monomer solution. The above-described nickel-containing solution was poured into the monomer solution at 50° C., subsequently raised to 70° C., and polymerization reaction was carried out for 2 hours to obtain 310 g of a black polymerization solution.

In a reaction container fed with water of 200 g, 100 g of the polymerization solution obtained was poured at room temperature, and stirred for 15 minutes. The color shade of precipitated solid was dark red and did not change. The precipitated solid was filtered and sufficiently washed with water. The resulting solid was fed in a reaction container, and 40 g of water was added to give a slurry liquid, which was poured in 130 g of 25.5% nitric acid, and stirred at room temperature for 1 hour. The color shade of the precipitated solid changed to grayish white from dark red. After the precipitated solid was filtered, the material on a filter was washed with water, and methanol, and then dried at 80° C. under reduced pressure for 24 hours, thereby as a grayish white solid to obtain 3.9 g of polyarylene containing a repeating unit shown by the following formula:

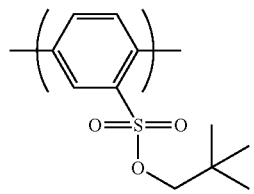

and a segment shown by the following formula:

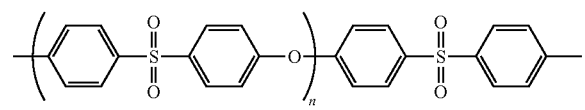

The thus obtained polyarylene of 3.0 g was added to a mixture of 1.4 g of lithium bromide and 45 g of N-methyl-2-pyrrolidone, and reacted at 120° C. for 24 hours. The reaction solution was poured in 150 g of 6 mol/L hydrochloric acid, and stirred for 1 hour. The precipitated solid was separated by filtration. The separated solid was washed with acidic methanol, and water, then dried at 90° C. for 24 hours, to thereby obtain 1.8 g (yield 73%) of black polyarylene containing a repeating unit shown below:

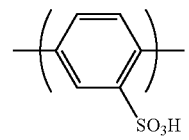

and a segment shown below:

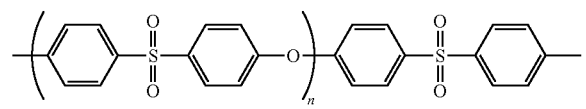

The result of ion-exchange capacity determined by a titration method was 2.3 meq/g.

The obtained polymer was analyzed by SEC condition A1, as a result, the number-average molecular weight (Mn) was $1.4 \times 10^5$, and the weight-average molecular weight (Mw) was $3.4 \times 10^5$. This is referred to polymer B.

The polymer B obtained was dissolved in dimethylsulfoxide (DMSO) to give a solution, which was coated using a bar coater, and dried at 80° C. under normal pressure for 2 hours. Thereafter, it was immersed in 1.5 mol/L hydrochloric acid, and further washed with ion-exchanged water to thereby obtain a film (film thickness=31 μm).

A solid content was obtained in the same way as in Example 1 except that the foregoing polymer B was 22 mg, N,N-dimethylformamide was 3 ml, and piperidine was 1 ml. The polydispersity (Mw/Mn) is determined to be 6.5 by the measurement in SEC condition A2.

EXAMPLE 3

An experiment was conducted in accordance with Example 2 except that the amount of dimethylsulfoxide used in preparation of monomer solution was changed to 57 g, thereby as a grayish white solid to obtain 3.9 g of polyarylene containing a repeating unit shown by the following formula:

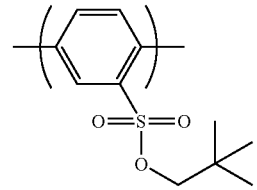

and a segment shown by the following formula:

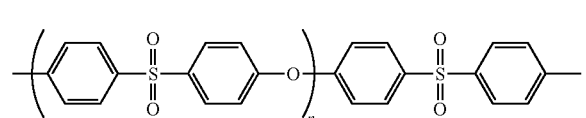

The thus obtained polyarylene of 3.0 g was added to a mixture of 1.4 g of lithium bromide and 45 g of N-methyl-2- pyrrolidone, and reacted at 120° C. for 24 hours. The reaction solution was poured in 150 g of 6 mol/L hydrochloric acid, and stirred for 1 hour. The precipitated solid was separated by filtration. The separated solid was washed with acidic methanol, and water, then dried at 90° C. for 24 hours, to thereby obtain 1.7 g (yield 71%) of black polyarylene containing a repeating unit shown below:

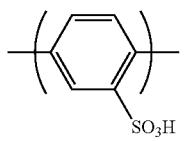

and a segment shown bellow:

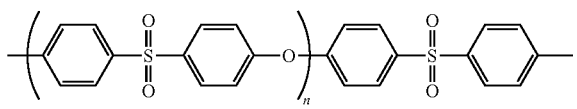

The result of ion-exchange capacity obtained by titration method was 2.1 meq/g. The obtained polymer was analyzed by SEC condition A1, as a result, the number-average molecular weight (Mn) was $1.2 \times 10^5$, and the weight-average molecular weight (Mw) was $3.6 \times 10^5$. This is referred to polymer C.

Using the obtained polymer C, a film (film thickness=18 μm) was obtained in the same way as the polymer B of Example 2. A solid content was obtained in the same way as in Example 1 except that the foregoing polymer C was 21 mg, N,N-dimethylformamide was 3 ml and piperidine was 1 ml. The polydispersity (Mw/Mn) is determined to be 7.1 by the measurement in SEC condition A2.

REFERENCE EXAMPLE 1

Under argon atmosphere, to a flask equipped with azeotropic distillation equipment, 5.0 g (20.0 mmol) of sodium 2,5-dichlorobenzenesolfonate, 7.8 g (50 mmol) of 2,2'-bipyridine, 160 ml of dimethylsulfoxide and 80 ml of toluene were fed and stirred. The temperature was raised until the inner temperature became 140° C., heat-refluxed at the temperature for 5 hours to remove water coexistent by azeotropic dehydration. Thereafter, toluene was distilled away over 2 hours, then allowed to stand until the inner temperature became 65° C. Next, 13.8 g (50 mmol) of bis(1,5-cyclooctadiene) nickel (0) was put at a time (within 5 seconds), stirred while heating at an inner temperature of 70° C. for 5 hours. After being left for cooling, the reaction liquid was poured into methanol of 20 times by weight, and the precipitate obtained was separated by filtration. Subsequently, the obtained precipitate was immersed in 6N hydrochloric acid for 2 hours, then filtered. In this way, after the operation of immersion in hydrochloric acid and filtration-separation was repeated three times, a coarse product was washed with a large quantity of acetone, and dried under reduced pressure, to thereby obtain polyphenylenesulfonic acid with a structure shown bellow of 3.5 g as powder.

The obtained polymer was analyzed by SEC condition A2, as a result, the number-average molecular weight (Mn) was $7.2 \times 10^4$, and the weight-average molecular weight (Mw) was $2.3 \times 10^5$. This is referred to polymer D.

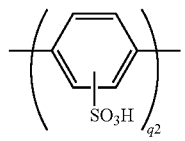

The same experiment was conducted except that polymer A was changed to the polymer D. A solid content was obtained in the same way as Example 1. A chromatogram obtained by SEC condition A2 was applied to calibration curves produced by standard products of polyethylene oxide and polyethylene glycol to find that the number-average molecular weight (Mn) obtained was $7.2 \times 10^4$, and the weight-average molecular weight (Mw) obtained was $2.3 \times 10^5$.

Even when a polymer having a polyarylene structure like polymer D was subjected to the chemical decomposition treatment of the present invention, deference in the analysis of molecular weight (Mn, Mw) after production was hardly observed.

EXAMPLE 4

COMPARATIVE EXAMPLE 1

From the respective aromatic block copolymers produced in Examples 2 and 3, a solution of about 10% by weight was prepared using dimethylsulfoxide as a solvent.

A film was formed from the solution by solution casting method. Haze values of the film obtained were measured in dry and wet conditions. The result is shown in Table 1.

TABLE 1

| | Aromatic block copolymer used | Haze value in dry condition | Haze value in wet condition |
|---|---|---|---|
| Example 4 | Aromatic block copolymer obtained in Example 2 | 1% | 2% |
| Comparative Example 1 | Aromatic block copolymer obtained in Example 3 | 15% | 33% |

The aromatic block copolymers of Examples 1 to 3 all were able to selectively decompose the segment 2 by the decomposition method of the present invention. The polymer of Reference Example 1 was an aromatic block copolymers having only a polyarylene structure, and it made clear that it was not decomposed by the decomposition method of the present invention.

The aromatic block copolymer of Example 3 has 7.1 of polydispersity of high molecular components of decomposed matter, when it was formed in a film, haze values of the film are large in both dry and wet conditions (Comparative Example 1), it showed a possibility that a large aggregation phase was formed in the film, and it was not uniform by observation with naked eye as well. On the other hand, the aromatic block copolymer of Example 2 has 6.5 of a polydispersity of high molecular components of decomposed matter when it was formed in a film, haze values of the film were small in both dry and wet conditions, showing a very good transparency (Example 4).

Industrial Applicability

As detailed above, the present invention provides the decomposition method and analysis method of the aromatic block copolymer suitable for providing a simple and highly precise analysis means on an aromatic block copolymer having a polyarylene segment. Further, it provides an aromatic block copolymer having a polyarylene segment with a specific polymer weight dispersion determined by using the decomposition method of the present invention, and a molded article and a catalyst composition comprising the aromatic block copolymer, and these can be used in various applications such as ion-conducting membrane for fuel cell, oxygen-permeating membrane and ion-exchange membrane, thus the industrial utility value of the present invention is extremely high.

The invention claimed is:

1. A decomposition method of an aromatic block copolymer, wherein the aromatic block copolymer comprises a segment 1 represented by the following general formula (1) and a segment 2 comprising a structural unit represented by the following general formula (2) and/or a structural unit represented by the following general formula (3), and the segment 2 is subjected to chemical decomposition to form a high molecular component comprising the segment 1

 (1)

wherein m represents an integer of 5 or more, $Ar^1$ represents a divalent aromatic group that may have a substituent, and $Ar^1$s of 5 or more may be the same as or different from each other,

 (2)

 (3)

wherein $Ar^{10}$, $Ar^{20}$ and $Ar^{21}$ each independently represent a divalent aromatic group that may have a substituent, $X^{10}$ and $X^{20}$ each independently represent an oxygen atom, a sulfur atom, an alkylene group having 1 to 10 carbon atoms or a fluorine-substituted alkylene group having 1 to 10 carbon atoms, and $Y^{20}$ represents a sulfonyl group, a carbonyl group or a fluorine-substituted alkylene group having 1 to 20 carbon atoms;

wherein the chemical decomposition is a chemical decomposition decomposing the aromatic block copolymer by a basic compound; and wherein the basic compound contains an organic amine.

2. The decomposition method according to claim 1, wherein the aromatic block copolymer is a block copolymer having an ion-exchange group and/or a group obtained by protecting an ion-exchange group with a protecting group.

3. The decomposition method according to claim 2, wherein the aromatic block copolymer is a block copolymer in which a part of or all of the 5 or more $Ar^1$s constituting the segment represented by the general formula (1) each have an ion-exchange group and/or a group obtained by protecting an ion-exchange group with a protecting group.

4. The decomposition method according to claim 1, wherein the basic compound contains a cyclic organic amine.

5. The decomposition method according to claim 1, wherein the basic compound contains at least one cyclic organic amine selected from the group consisting of pyrrolidine, piperazine and piperidine.

6. An analysis method of an aromatic block copolymer comprising identifying a chemical structure of a high molecular component in a decomposed matter obtained by the decomposition method according to claim 5.

7. An analysis method of an aromatic block copolymer comprising analyzing a molecular weight and/or a polydispersity of a high molecular component in a decomposed matter obtained by the decomposition method according to claim 5.

8. An analysis method of an aromatic block copolymer comprising analyzing analyzing a molecular weight and/or a polydispersity of a high molecular component in a decomposed matter obtained by the decomposition method according to claim 5, by means of size exclusion chromatography.

* * * * *